United States Patent [19]

Kinugasa et al.

[11] 4,376,370

[45] Mar. 15, 1983

[54] POWER TRANSMISSION FOR AN AUTOMOBILE

[75] Inventors: Haruo Kinugasa; Koujirou Hase, both of Ikeda; Shigeru Takeshita, Neyagawa; Masao Mizue, Kadoma, all of Japan

[73] Assignees: Daihatsu Motor Co., Ltd.; Daikin Manufacturing Co., Ltd., both of Osaka, Japan

[21] Appl. No.: 186,205

[22] Filed: Sep. 10, 1980

[30] Foreign Application Priority Data

Sep. 29, 1979 [JP] Japan .................. 54-125522

[51] Int. Cl.³ ............................................. F16D 33/00
[52] U.S. Cl. ................................... 60/337; 60/339; 60/367; 192/3.21
[58] Field of Search ............... 192/3.28, 3.29, 3.21, 192/3.3, 3.25; 60/337, 339, 367

[56] References Cited

U.S. PATENT DOCUMENTS

| | | | |
|---|---|---|---|
| 2,340,494 | 2/1944 | Smirl | 60/337 |
| 2,611,248 | 9/1952 | Ahlen et al. | 60/337 |
| 2,679,728 | 6/1954 | Trail | 60/337 |
| 2,701,948 | 2/1955 | Iavelli et al. | 60/339 |

*Primary Examiner*—George H. Krizmanich
*Attorney, Agent, or Firm*—Stevens, Davis, Miller & Mosher

[57] ABSTRACT

A power transmission for an automobile, which is provided with an oil circulation type fluid coupling and a clutch mechanism so that power may be transmitted from an output shaft of an engine to an input shaft of a gear transmission. The output and input shafts support an intermediate shaft to which a pump at the fluid coupling is rotatably supported, so that a partition for supporting the intermediate shaft is eliminated. At the fluid coupling are provided an oil-charge passageway for charging to the fluid coupling a part of lubricating oil for the engine and an oil-return passageway for collecting into an engine oil pan the oil flowing out of the fluid coupling.

11 Claims, 5 Drawing Figures

POWER TRANSMISSION FOR AN AUTOMOBILE

FIELD OF THE INVENTION

This invention relates to a power transmission for an automobile, and more particularly to a power transmission which transmits power from an output shaft of an engine of the automobile to an input shaft of a gear transmission through an oil circulation type fluid coupling and a clutch mechanism. The power transmission of the invention principally resides in the fluid coupling and clutch mechanism.

BACKGROUND OF THE INVENTION

Generally, a semi-automatic gear transmission for an automobile, which is capable of changing gears through automatic engagement or disengagement of a clutch without using a clutch pedal is provided with a fluid coupling interposed between an engine and the gear transmission to thereby absorb a shock caused by the clutch engagement so that power from the engine may be transmitted to the gear transmission by way of the fluid coupling and clutch. The fluid coupling, clutch, and gear transmission, which are disposed in alignment on the axis of the output shaft of the engine, are housed within one housing and assembled integrally with the engine. These three units together with a differential gear unit having a drive shaft, constitute a power unit. The power unit is mounted in an engine compartment at the front or rear of the automobile in either a transverse or longitudinal position so that the axis of the output shaft extends widthwise or longitudinally of the carbody.

The aforesaid power transmission usually has a partition between the fluid coupling and the clutch, the partition carrying one axial end of an intermediate shaft, a free end of the output shaft of the gear transmission, and a boss of a pump at the fluid coupling, where a turbine thereof and a clutch wheel at the clutch are connected with the intermediate shaft.

The provision of the partition within the housing increases the axial length of the power transmission as a whole due to the aligned arrangement of the fluid coupling, clutch, and gear transmission. Especially in a front-engine front-drive type automobile, when the engine is transversely mounted, the width of the engine compartment is limited causing difficulty as the engine room is too small to accommodate the power unit.

On the other hand, the oil circulation type fluid coupling uses as operating oil a part of lubricating oil supplied under pressure to each engine unit by means of an oil pump, and the oil, after use as operating oil, is returned from the fluid coupling into the engine. Passageways, through which the oil is supplied to or returned from the fluid coupling, are formed partially at the partition and open therethrough to the exterior of the housing, the openings of the passageways being connected with oil pipes so that the passageways communicate with the interior of the engine.

One problem with this arrangement is the oil passageways are complicated in construction and use of the oil pipes increases the number of required parts. Furthermore, there is a possibility of not only a breakdown at the oil pipes but also leakage of the lubricating oil caused by a broken pipe, resulting in damage to the engine or poor transmission of power due to a shortage of lubricating oil.

SUMMARY OF THE INVENTION

This invention has been designed to overcome the aforesaid problems in the conventional transmission. A main object of the invention is to provide a power transmission having a reduced overall axial length which is suitable especially for an automobile having a transversely mounted engine. Another object of the invention is to provide a power transmission having simplified oil-charge and oil-return passageways to thereby overcome the aforesaid problems created by use of the conventional oil pipe.

Since the provision of the partition within the housing causes the power transmission to have an increase axial length as a whole, the power transmission of the invention has been designed so that the partition is omitted by virtue of a newly designed construction for supporting the intermediate shaft and the oil-charge and oil-return passageways, thereby reducing the axial length as a whole. This invention is characterized in that the intermediate shaft is supported by one end of an output shaft of the engine and one end of an input shaft of the gear transmission, and that the output shaft is utilized to form the oil-charge and oil-return passageways.

The intermediate shaft rotatably carries a pump at the fluid coupling and not-rotatably a turbine thereat, and fixes a clutch wheel of a clutch mechanism, the pump being coupled with a drive plate fixed to the output shaft. The clutch wheel is opposite to a clutch disc coupled with the input shaft at the gear transmission, the clutch disc contacting against the clutch wheel so that power from the intermediate shaft may be transmitted to the input shaft at the gear transmission. In other words, the power from the output shaft is transmitted to the pump through the drive plate and to the turbine through operating oil within the fluid coupling, so that the intermediate shaft is rotated to transmit the power to the input shaft of the gear transmission through the clutch mechanism.

The output shaft of the engine is supported to a cylinder block thereof and the input shaft at the gear transmission is supported to a transmission case housing therein the gear transmission, the output shaft and input shaft supporting the intermediate shaft which carries the pump coupled with the drive plate, thus making it possible to omit the partition.

The drive plate is made thick to increase its rigidity to thereby more reliably support the intermediate shaft by way of the pump.

Next, the oil-charge passageway to the fluid coupling and the oil-return passageway to the engine will be described. These passageways are all disposed at the output shaft. The oil-charge passageway communicates at the inlet side thereof with a source of oil supply, i.e., a discharge port of an oil pump driven by the engine, and at the outlet side with the interior of the fluid coupling by way of an interconnecting passageway provided at the intermediate shaft, so that a part of lubricating oil is fed from the engine into the fluid coupling. The oil-return passageway communicates at its inlet side with the rear surface side of the turbine and at the outlet side with the interior of the engine.

Hence, upon operation of the engine, lubricating oil charged under pressure into the engine by the oil pump is fed in part into the fluid coupling by way of the oil-charge passageway, and the oil, after use as operating oil, flows through the oil-return passageway to be collected in an oil pan in the engine. All the passageways are formed by use of the output shaft instead of the conventional partition to supply the oil-charge to the fluid coupling and oil-return to the engine. Also, elimination of the conventional oil pipes reduces the number of parts and eliminates the problem of a breakdown of the pipe.

In this invention, the pump and turbine at the fluid coupling comprise substantially flat shells respectively, thereby enabling the power transmission, as a whole, to be further reduced in axial length. At least the pump, among the pump and turbine, is provided with an annular core ring of a plate-like shape so that the fluid coupling may have an increased capacity coefficient and improved coupling efficiency of power transmission from the pump to the turbine.

In addition, the fluid coupling described in this invention includes a fluid torque converter.

These and other objects and advantages of the invention will become more apparent upon a reading of the following detailed specification and drawings.

DETAILED DESCRIPTION OF THE INVENTION

Figure 1:
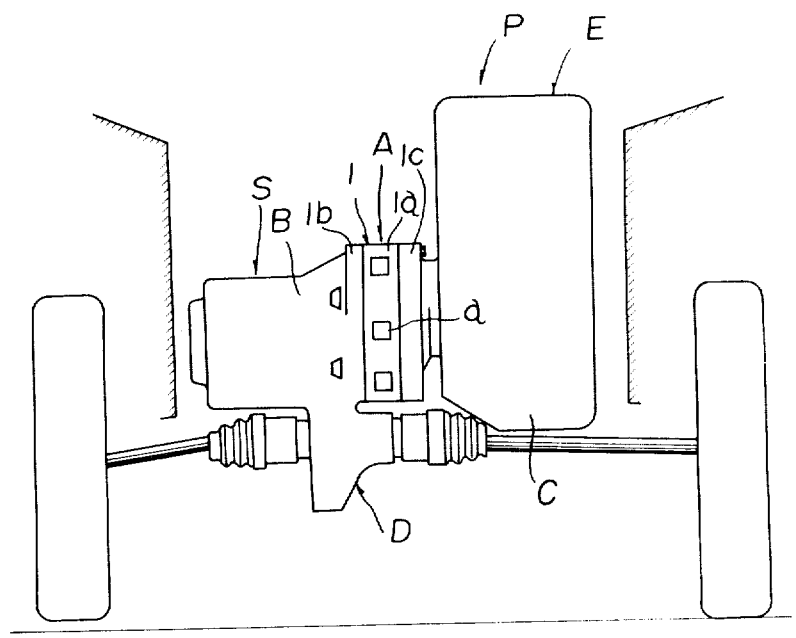
FIG. 1 is a schematic view explanatory of a power unit employing a power transmission of the invention and disposed within an engine compartment of an automobile in condition of being transverse widthwise of the car-body.

A power transmission A of the invention, as shown in FIG. 1, is interposed between an automotive engine E and a gear transmission S and transmits power thereto from the engine. The power transmission A and gear transmission S are disposed in alignment on the axis of an output shaft or crankshaft of the engine E. The power transmission A and gear transmission S form a power unit P together with a differential gear unit D disposed below the power transmission A.

FIG. 1 shows the transverse power unit P mounted at the front of the automobile widthwise thereof.

The power transmission of the invention basically comprises a housing 1, a clutch mechanism 2, an oil circulation type fluid coupling 3, a drive plate 5 for transmitting power from the output shaft 4 of engine E to the fluid coupling 3, and oil circulation means for circulating oil in the fluid coupling 3.

The housing 1 comprises a cylindrical main housing 1a, a first subhousing 1b extending from a transmission case B housing therein the gear transmission S, and a second subhousing 1c extending from the engine E. Both axial ends of main housing 1a and one axial end of the respective first and second subhousings 1b and 1c, have connecting end faces and flanges, the connecting end faces abutting against each other so that the flanges are connected by a plurality of stay bolts 1d. In this case, the connecting end faces of main housing 1a and first subhousing 1b are positioned in the vicinity of the outer periphery of clutch mechanism 2.

The clutch mechanism 2, fluid coupling 3, and drive plate 5, are disposed in alignment on the axis of output shaft 4 of engine E and housed within the housing 1, the output shaft 4 projecting through the second subhousing 1c to enter into the housing 1. An input shaft 6 of gear transmission S extends from the first subhousing 1b into the housing 1. Between the output shaft 4 and the input shaft 6 is interposed an intermediate shaft 7, which is supported at its both ends rotatably by the output shaft 4 and input shaft 6.

In detail, the intermediate shaft 7 has one smaller diameter axial end at the output shaft side, the smaller diameter end being insertably supported to a bearing bore 4a provided at one axial end of output shaft 4, in relation of being rotatable through a metallic bearing 8. Intermediate shaft 7 has a larger diameter portion at the other axial end, the larger diameter end being provided at its central portion with a shaft bore 7a, into which the foremost end of input shaft 6 is insertably supported in relation of being rotatable through a needle bearing 9.

The clutch mechanism 2 comprises a frictional clutch, and is provided with a clutch wheel 20 fixed to the end of intermediate shaft 7 at the input shaft side and with a clutch disc 21 fixed to a hub 22 spline-connected to the input shaft 6. A diaphragm spring 24 at a pressure plate 23 acts to press-contact the clutch disc 21 against the clutch wheel 20 to thereby transmit power from the intermediate shaft 7 to the input shaft 6. In addition, reference numeral 25 designates a shifting fork operable by an actuator (not shown), and 26 designates a release bearing actuated by the shifting fork 25 to travel toward the engine E, thereby biasing the diaphragm spring 24.

The fluid coupling 3 comprises a pump 31 and a turbine 32. The pump 31 is supported at its boss 31c to the intermediate shaft 7 rotatably through a ball bearing 10, the turbine 32 being fixed to a hub 11 spline-connected to the intermediate shaft 7.

The fluid coupling 3, as shown in the drawings, has its pump 31 disposed at the gear transmission side, and its turbine 32 at the engine side. At the engine side of the turbine 32 is disposed a front cover 33 having at its outer peripheral portion a spacer 34 fixed thereto, the spacer 34 being fixed to the outer peripheral portion of the pump 31 shell, abutting against a plurality of mounting portions 51 formed at the outer peripheral portion of drive plate 5, and being fixed thereto by bolts 13.

The drive plate 5 is disposed opposite to the surface of front cover 33 at the engine side, positioned on the output shaft 4 at the portion thereof entering into the housing 1 through the second subhousing 1c, and fixed to the output shaft 4 by a plurality of bolts 15.

Also, the drive plate 5 comprises a disc having a central mounting portion mounted on the output shaft 4. The disc, which has rigidity in itself, is made thick, e.g., about 4 mm in thickness, so as to raise its rigidity, whereby the drive plate 5 has strength enough to bear the intermediate shaft 7. In other words, since the pump 31 is connected to the drive plate 5 and rotatably supported to the intermediate shaft 7 through the boss 31c, the drive plate 5 of high rigidity is able to support the intermediate shaft 7 by way of the pump 31, thus further ensuring reliable support of the intermediate shaft 7.

The pump 31 and turbine 32 at the fluid coupling 3 comprise shells 31a and 32a each having an annular hollow, and a plurality of thin blades 31b and 32b disposed within the hollows at the shells 31a and 32a respectively, the shells 31a and 32a being opposite at their hollows to each other so that oil is forced to flow in circulation within the hollows to thereby transmit power from the pump 31 to the turbine 32 by way of the oil.

Figure 2:
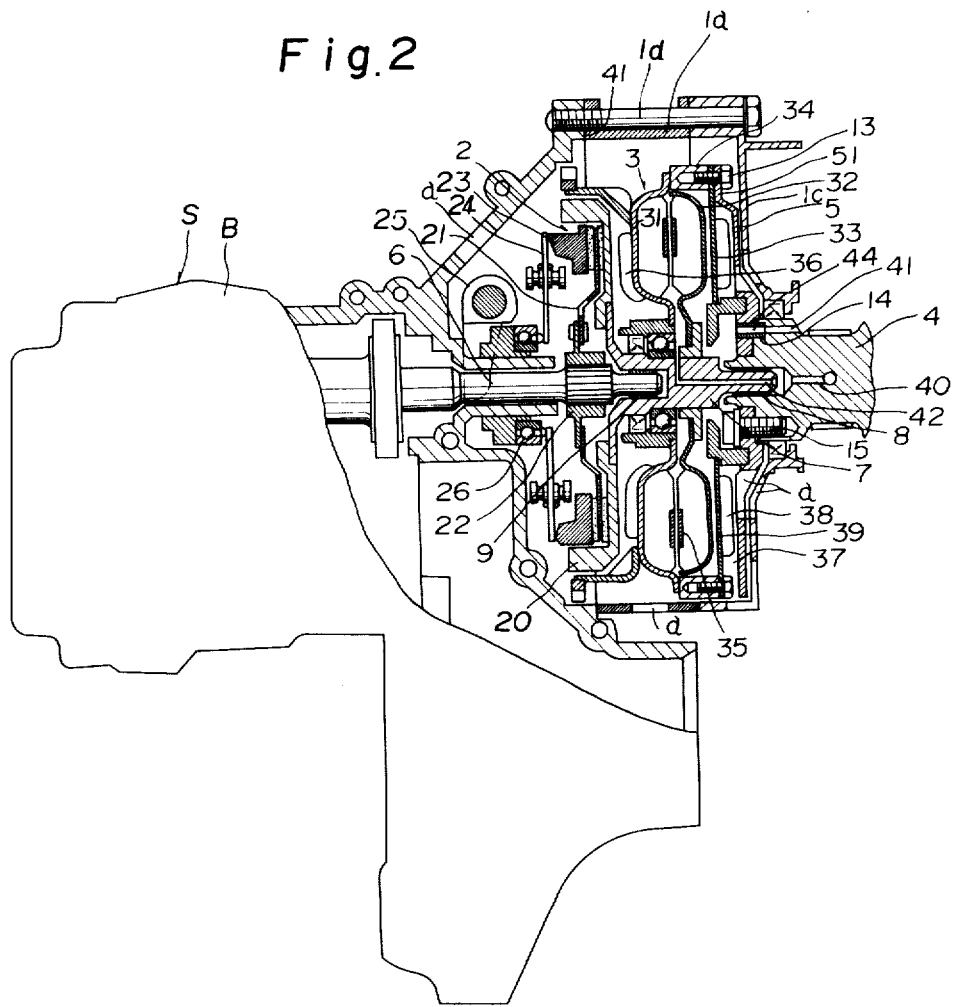
FIG. 2 is an enlarged partially cutaway front view of the power unit in FIG. 1.
Figure 3:
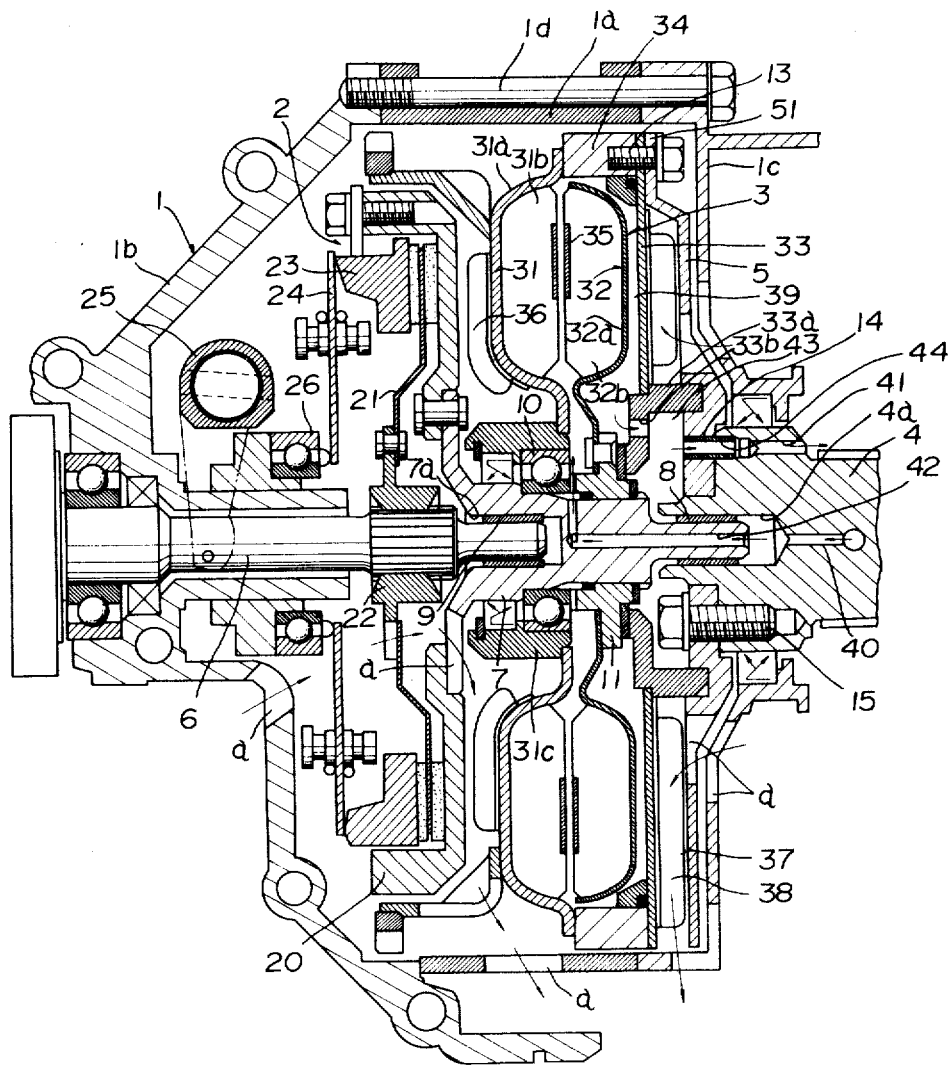
FIG. 3 is an enlarged sectional view of the power transmission of the invention.

The shells 31a and 32a at the pump 31 and turbine 32 are preferably of the flat type respectively as shown in FIGS. 2 and 3. Such formation can further reduce the axial length of the power transmission as a whole in cooperation with the aforesaid construction such that the intermediate shaft 7 is supported by the output and input shafts 4 and 6 without using the conventional partition.

At least the flat type pump shell 31a and, preferably both the pump shell 31a and a flat type turbine shell 32a are provided with annular plate-like shaped core rings 35 parallel to the flat walls of shells 31a and 32a, the core rings 35 closing the hollows at substantially central portions thereof respectively.

The attachment of the core rings 35 makes it possible to rectify a flow of oil within the pump 31 and turbine 32, thereby improving the coupling efficiency of fluid coupling 3 because of an increase in the ratio of the number of input rotations of pump 31 to that of output rotations of turbine 32, and in turn, the capacity coefficient of fluid coupling 3.

A plurality of air vents a are provided at the housing 1, and cooling fins 36 at the outer surface of pump 31, the fins 36 revolving following the rotation of pump 31 to create an air flow, thereby removing, by the self-cooling effect, heat generated during power transmission.

In the aforesaid construction, an air duct 37 is provided between the drive plate 5 and the front cover 33 at the fluid coupling 3 and fins 38, may be attached to the drive plate 5 or front cover 33. In this instance, the fins 38, which revolve within the air duct 37 formed in a space between the drive plate 5 and the front cover 33, are subjected to less air resistance against revolution to thereby ensure positive flow of a sufficient amount of air for effective cooling. As a result, the fins 38 in cooperation with the fins 36 at the pump 31 further ensure the cooling effect.

Next, oil circulation means for circulating oil in the fluid coupling 3 will be described.

The oil circulation means functions to feed into the fluid coupling 3 a part of the lubricating oil from the engine and to return the oil thereto from the fluid coupling 3. It comprises an oil-charge passageway 40 and an oil-return passageway 41, provided at the output shaft 4, so that the oil may circulate through both the passageways 40 and 41. The oil-charge passageway 40 communicates at its inlet side with a source of oil-supply, such as an oil pump rotatably driven by the engine E, that is with a lubricating oil supply line connected to the oil pump at the delivery port side thereof, and communicates at the outlet side with an interconnecting passageway 42 provided at the intermediate shaft 7 and opens at the interior of fluid coupling 3 by way of the interconnecting passageway 42.

Referring to the drawings, the oil-charge passageway 40 is provided at the center of the output shaft 4, and the interconnecting passageway 42 at the center of the intermediate shaft 7. The interconnecting passageway 42 opens at its inlet side in the bearing bore 4a of output shaft 4 and bends at the outlet side radially of the intermediate shaft 7 to open between the ball bearing 10 carrying the pump 31 and the hub 11 carrying the turbine 32.

The oil-return passageway 41 communicates at its inlet side with a rear chamber 39 at the rear surface side of turbine 32 and between the turbine 32 and the front cover 33, and at the outlet side with an oil pan (not shown) in the engine E. On the central portion of front cover 33 is mounted a partition 33a to divide the air duct 37 formed between the cover 33 and the drive plate 5, thereby forming an annular space 43 surrounding the intermediate shaft 7. The space 43 communicates with the rear chamber 39 through a communicating bore 33b and the oil-return passageway 41 opens at the inlet side thereof into the space 43.

As shown in the drawings, an interconnecting passageway 44, which opens at the annular space 43 and communicates with the oil-return passageway 41, is provided at the drive plate 5 which is fixed to the output shaft 4, and is positioned shifted from the center of output shaft 4.

The interconnecting passageway 44 at the drive plate 5 may be formed by use of a knock-pin 14 which positions the drive plate 5 with respect to the output shaft 4.

In detail, the knock-pin 14 is made hollow, inserted into a through bore at the drive plate 5, and is fitted into the oil-return passageway 41 provided at the output shaft 4 to thereby position the drive plate 5 with respect to the output shaft 4, the hollow of knock-pin 14 serving as the interconnecting passageway 44 to communicate with the oil-return passageway 41.

As seen from the above, an extra passage bore need not be provided at the drive plate 5, and the drive plate 5 retains it strength, even while having the interconnecting passageway 44, due to the fact that the knock-pin 14 is also used as the interconnecting passageway 44. Furthermore, the knock-pin 14, when replaced by a solid pin, can change with ease the oil circulation type fluid coupling into an enclosed-type fluid coupling. Hence, for example, the fluid coupling is usuable as the oil circulation type at a warm region where the operating oil should be kept cool, and as the enclosed-type at a cold region unnecessary for cooling the oil.

In the aforesaid construction, the knock-pin 14 alternatively may form the oil-return passageway 41, or connect with the output shaft 4, and also may be replaced by a bolt 15 for fixing the drive plate 5 to the output shaft 4.

Next, the function of power transmission of the invention will be described. Upon operation of the engine E, the output shaft 4 is driven to actuate the oil pump (not shown) in association therewith to thereby charge lubricating oil into rotary units at the engine E, at which time, a part of the lubricating oil is introduced into the hollows at the fluid coupling 3 from the oil-charge passageway 40 at the output shaft 4 through the interconnecting passageway 42. Thus, the oil functions as operating oil to transmit the power from the pump 31 to the turbine 32, thereby rotating the intermediate shaft 7.

The oil within the hollows at the fluid coupling 3, after use as operating oil, flows radially outwardly of the turbine 32 to be discharged into the rear chamber 39 and then returned to the engine E through the interconnecting passageway 44 and oil-return passageway 41, thus being collected within the oil pan (not shown) in the engine case C.

Alternatively, conversely to the above embodiment, the oil-charge passageway 40 may be provided at a portion shifted from the center of the output shaft 4, and the oil-return passageway 41 at the center of output shaft 4, in which the interconnecting passageway 42 providing communication between the hollows of fluid coupling 3 and the oil-charge passageway 40, is formed at the drive plate 5, and the interconnecting passageway 44 providing communication between the oil-return passageway 41 and the rear chamber 39, is formed at the intermediate shaft 7.

Figure 4:
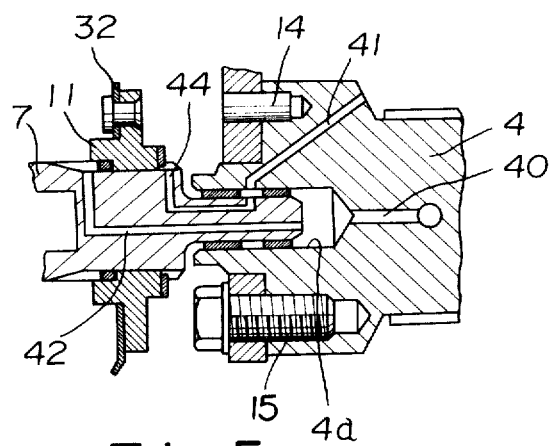
FIG. 4 is a partially sectional view of a modified embodiment of an oil passageway.
Figure 5:
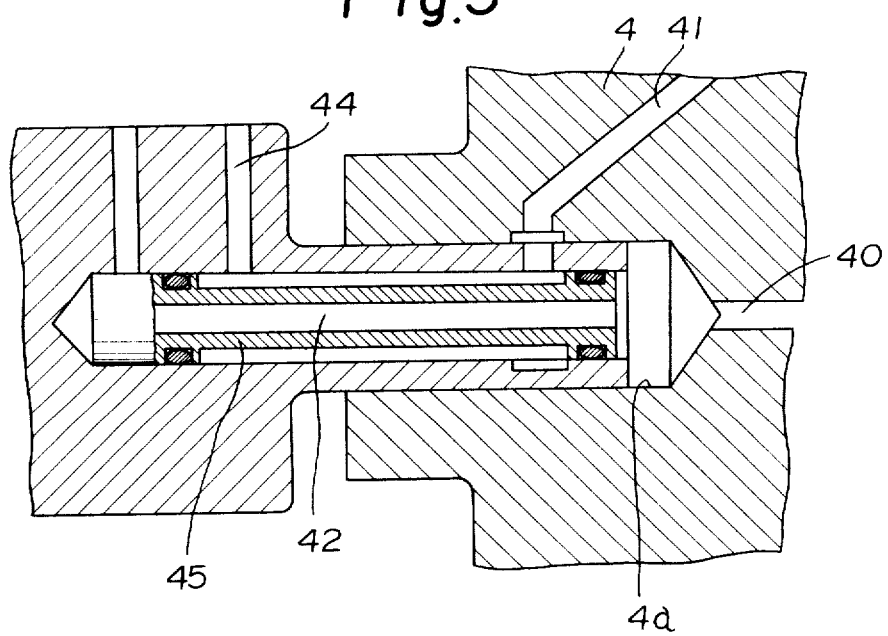
FIG. 5 is an enlarged partially sectional view of another modified embodiment of the oil passageway.

Both the interconnecting passageways 42 and 44 alternatively may be provided at the intermediate shaft 7 or drive plate 5. Also, the passageways 42 and 44, when provided at the intermediate shaft 4, may be disposed in parallel as shown in FIG. 4, or concentrically by use of a flanged pipe 45 as shown in FIG. 5. In either case, the interconnecting passageway 42 communicating with the oil-charge passageway 40, is allowed to communicate with the space at the fluid coupling 3, and the interconnecting passageway 44 communicating with the oil-return passageway 41, is allowed to communicate with the rear chamber 39 of turbine 32. One of the oil-charge passageway 40 and oil-return passageway 41 is allowed to open at the bearing bore 4a axially thereof and communicate with one interconnecting passageway 42 or 44 open at the bore 4a, and the other of passageways 40 and 41 is allowed to open at the bearing bore 4a radially thereof and communicate with the other interconnecting passageway 42 or 44 open at the axial end of intermediate shaft 7 radially from the inside thereof.

In the above embodiment, it is advantageous that the interconnecting passageway 44 between the oil-return passageway 41 and the rear chamber 39 can be simplified due to the fact that the pump 31 is disposed at the gear transmission side and the turbine 32 at the engine side, but the pump 31 and turbine 32 may be disposed vice versa, where the interconnecting passageway 44 is provided at the intermediate shaft 7. In addition, a rear cover opposite to the turbine 32 is provided at the shell 31a of pump 31 and has at the center a boss which can support an end of the intermediate shaft 7 at the gear transmission side. In this invention, the rear cover is assumed to be included in the pump 31.

As clearly understood from the above description, the power transmission of the invention is so constructed that the intermediate shaft is supported by the output shaft of the engine and the input shaft of the gear transmission, and rotatably carries the pump connected with the drive plate, so that the conventional partition need not be provided between the clutch and the fluid coupling. A drive plate having a larger thickness has a high rigidity so as to also bear the intermediate shaft by way of the pump, thereby further improving the rigidity for supporting the intermediate shaft.

Hence, the power transmission of the invention is able to reduce its axial length due to provision of no partition, and is useful especially for the front-engine, front-drive type automobile having a transversely mounted engine.

Furthermore the provision, at the engine output shaft, of the oil-charge and oil-return passageways communicating with the fluid coupling, can simplify the passageway construction, through which a part of lubricating oil for the engine is used as operating oil in circulation between the fluid coupling and the engine. Also, there is no need of providing the oil-return passageway at the partition as conventional and of using the oil pipe for collecting in the engine the operating oil flowing out of the fluid coupling, whereby the number of parts is reduced and the conventional drawbacks caused by use of the oil pipes are eliminated.

While several exemplary embodiments of the invention have been shown and described, the invention is not limited to the exemplary specific construction thereof, but only by the claims which are appended hereto.

What is claimed is:

1. A power transmission for an automobile, which transmits power from an output shaft of an engine to an input shaft of a gear transmission, said power transmission comprising:
   a housing;
   a fluid coupling mounted within said housing and having a pump and a turbine, and a rear chamber at the rear surface side of said turbine;
   a clutch mechanism mounted within said housing and having a clutch wheel for selectively transmitting the power from said turbine to said input shaft;
   an intermediate shaft supported at both axial ends thereof rotatably by said output and input shafts, said output shaft being provided at its one axial end with a bearing bore for receiving one axial end of said intermediate shaft, said intermediate shaft being inserted and journaled at its said one axial end into said bearing bore, said intermediate shaft rotatably supporting said pump at said fluid coupling, non-rotatably supporting said turbine, and securing said clutch wheel of said clutch mechanism;
   a drive plate for transmitting the power from said output shaft to said pump at said fluid coupling, said drive plate being disposed at the rear surface said of said turbine at said fluid coupling and coupled with the outer peripheral portion of said pump;
   an oil-charge passageway for charging a part of the lubricating oil for said engine into said fluid coupling, said oil-charge passageway being disposed at said output shaft and communicating at its inlet side with a source of oil supply, said oil-charge passageway including an interconnecting passageway which communicates at its outlet side with said fluid coupling, said oil-charge passageway including an intermediate outlet portion opening into said bearing bore, said interconnecting passageway being open at its inlet side in said bearing bore; and,
   an oil-return passageway for returning oil flowing out of said fluid coupling into said engine, said oil-return passageway being disposed at said output shaft and communicating at the inlet side with said rear chamber of said turbine and at the outlet side with the interior of said engine.

2. A power transmission for an automobile according to claim 1, wherein said oil-return passageway is formed surrounding the outer periphery of said intermediate shaft, includes an annular space open at the rear surface side of said turbine at said fluid coupling to thereby communicate with said rear chamber of said turbine through said space, and is open at the end at the outlet side into said engine.

3. A power transmission for an automobile according to claim 2, wherein said oil-return passageway includes an interconnecting passageway through which said oil-return passageway communicates with said annular space, said interconnecting passageway being disposed at said drive plate which is fixed to said output shaft.

4. A power transmission for an automobile according to claim 2, wherein said oil-return passageway includes an interconnecting passageway through which said oil-return passageway communicates with said annular space, said interconnecting passageway being disposed at said intermediate shaft.

5. A power transmission for an automobile according to claim 1, wherein one of said output shaft and drive plate has at least one knock-pin for positioning said drive plate with respect to said output shaft, said knock-pin being made hollow to form said oil-return passageway.

6. A power transmission for an automobile according to claim 1, being provided with a connecting member for connecting said output shaft and said drive plate, said connecting member being made hollow so as to form therewith said oil-return passageway.

7. A power transmission for an automobile according to claim 1, wherein said pump at said fluid coupling is disposed at the side of said input shaft of said gear transmission and said turbine is disposed at the side of said output shaft, said drive plate coupled with said pump and said fluid coupling having therebetween an air duct, one of said drive plate and fluid coupling which form said air duct therebetween, being provided with fins, and said drive plate and housing having air vents through which said air duct opens to the exterior of said housing.

8. A power transmission for an automobile according to claim 1, wherein said drive plate comprises a thick plate of high rigidity, so that said pump at said fluid coupling is rigidly connected to said drive plate, said pump being provided with a cylindrical boss, said intermediate shaft projecting through the central portion of said boss in relation of being rotatable, thereby being supported at the input shaft side to said drive plate by way of said pump.

9. A power transmission for an automobile according to claim 1, wherein said pump and turbine at said fluid coupling have shells having annular spaces and a plurality of vanes disposed within said spaces respectively, each of said shells being formed in a flat shape, and said shell of at least said pump among said pump and turbine having a core ring of a plate-like shape for closing an approximately central portion of said annular space, said core ring being disposed in parallel to the flat portion of each of said shells of flat shape.

10. A power transmission for an automobile according to claim 1, wherein said housing comprises a cylindrical main housing covering said fluid coupling, a first subhousing extending from a transmission case which houses therein said gear transmission, and a second subhousing extending from an engine case which houses therein said engine, said main housing and first and second subhousings having at each end thereof a connecting end face, said connecting end faces of said main housing and first subhousing being positioned in proximity to the outer peripheral portion of said clutch mechanism.

11. A power transmission for an automobile, which transmits power from an output shaft of an engine to an input shaft of a gear transmission, said power transmission comprising:

a housing;

a fluid coupling mounted within said housing and having a pump and a turbine, and a rear chamber at the rear surface side of said turbine;

a clutch mechanism mounted within said housing and having a clutch wheel for selectively transmitting the power from said turbine to said input shaft;

an intermediate shaft supported at both axial ends thereof rotatably by said output and input shafts, said intermediate shaft rotatably supporting said pump at said fluid coupling, not-rotatably supporting said turbine, and securing said clutch wheel of said clutch mechanism;

a drive plate for transmitting the power from said output shaft to said pump at said fluid coupling, said drive plate being disposed at the rear surface side of said turbine at said fluid coupling and coupled with the outer peripheral portion of said pump;

an oil-charge passageway for charging a part of the lubricating oil for said engine into said fluid coupling, said oil-charge passageway being disposed at said output shaft and communicating at the inlet side with a source of oil supply and at the outlet side with the interior of said fluid coupling; and, an oil-return passageway for returning oil flowing out of said fluid coupling into said engine, said oil-return passageway being disposed at said output shaft and communicating at the inlet side with said rear chamber of said turbine and at the outlet side with the interior of said engine.

* * * * *